July 4, 1967
W. D. VOIGT ETAL
3,328,904
POWER BUCKET
Filed April 15, 1964
2 Sheets-Sheet 1
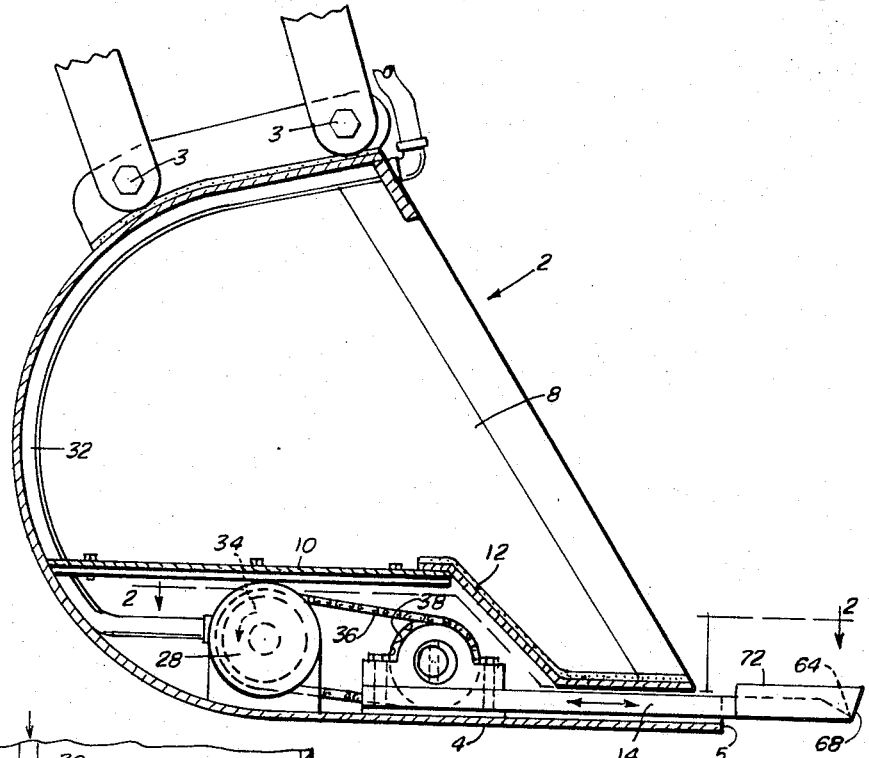
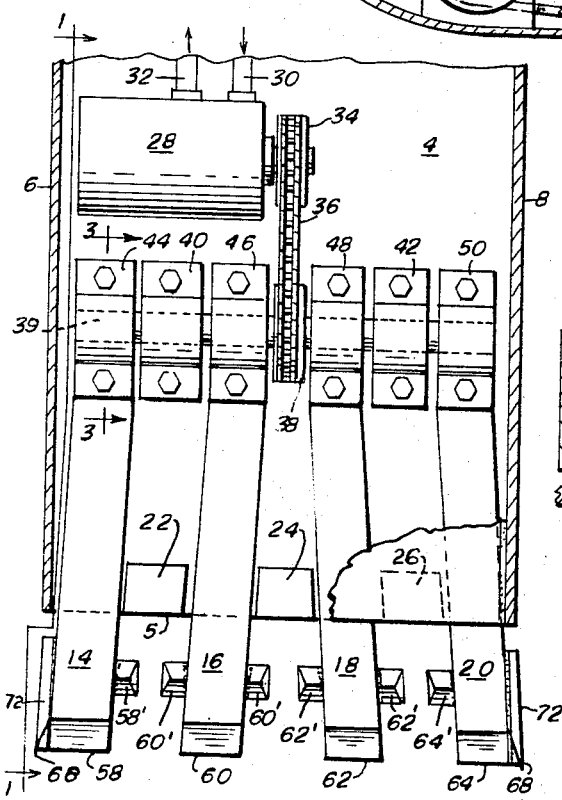
INVENTORS
**WALLACE D. VOIGT
MERL L. DAVIDSON**
BY
ATTORNEYS July 4, 1967  W. D. VOIGT ET AL  3,328,904
POWER BUCKET Filed April 15, 1964  2 Sheets-Sheet 2

INVENTORS
**WALLACE D. VOIGT
MERL L. DAVIDSON**

BY *Beale and Jones*

ATTORNEYS

United States Patent Office 3,328,904
Patented July 4, 1967

3,328,904
POWER BUCKET
Wallace D. Voigt, Amherst, Colo., and Merl L. Davidson, Lamar, Nebr., assignors to Davidson Voigt Engineering Corporation, Amherst, Colo., a corporation of Colorado
Filed Apr. 15, 1964, Ser. No. 360,028
6 Claims. (Cl. 37—142)

This invention relates to a bucket of the type used in excavating machinery. The bucket of this invention is provided with a plurality of teeth located at the edge which penetrates the earth; i.e. the loading lip, and these teeth are moved in a generally reciprocating manner.

The bucket disclosed herein may readily be adapted to use in various types of excavating equipment; for example, on front end loaders, shovels, clamshells, back hoe buckets, and various similar machines in common use. The illustrated embodiment is a bucket used in a back hoe machine.

Excavating equipment in use today, while quite effective for operating on ordinary unfrozen earth is considerably less useful when confronted with a harder material such as frozen earth, shale rock, limestone and the like.

The buckets in common use today frequently have teeth fixed to the loading lip, but there are no provisions for causing these teeth to move with respect to the bucket to assist in penetrating the earth. The prior art has, on occasions, suggested that the teeth of these buckets be reciprocated, but these devices have not gained widespread acceptance in the trade. The recent U.S. Patent 3,065,557 to Pewthers which shows an hydraulic impact device for driving the teeth; and British Patent 710,650 which shows a rotatable crank arm for reciprocating the teeth are exemplary of devices of the prior art.

It is an object of this invention to provide a bucket which overcomes some of the shortcomings of the prior art devices by utilizing a relatively simple and quite effective means for moving the teeth.

Another object is to provide an effective path of movement for the cutting tooth itself, whereby the tip of the tooth does not simply reciprocate, but instead moves through a generally flat elliptical path, moving slightly up and down as it pursues its generally reciprocating motion.

Still another object is to provide a bucket which contains as a self-contained portion thereof, a rotary driving motor and means for transmitting this motion to the teeth in a manner so that they move in the desired path.

A further object is to provide tooth structure which results in more effective earth penetration by a power bucket.

These and other objects are achieved by providing the bucket with a plurality of outwardly extending elongated teeth at its loading lip, means slidably holding these teeth in the bucket near the loading lip, and means driving the non-cutting end of the teeth in a circular path which is perpendicular to the bottom wall of the shovel and parallel to the longitudinal axis of the teeth. This produces the desired reciprocating and up-and-down motion of the teeth, which is a valuable feature of this invention.

A more complete understanding of the invention may be had by referring to the following description and the drawings wherein:

FIG. 1 is a side elevation in cross section taken along the line 1—1 in FIG. 2;

FIG. 2 is plan view of the bucket with the inner bottom removed, taken along line 2—2 in FIG. 1, and showing the various elements for driving the teeth;

FIG. 3 is a sectional view taken along lines 3—3 in FIG. 2;

Figure 4:
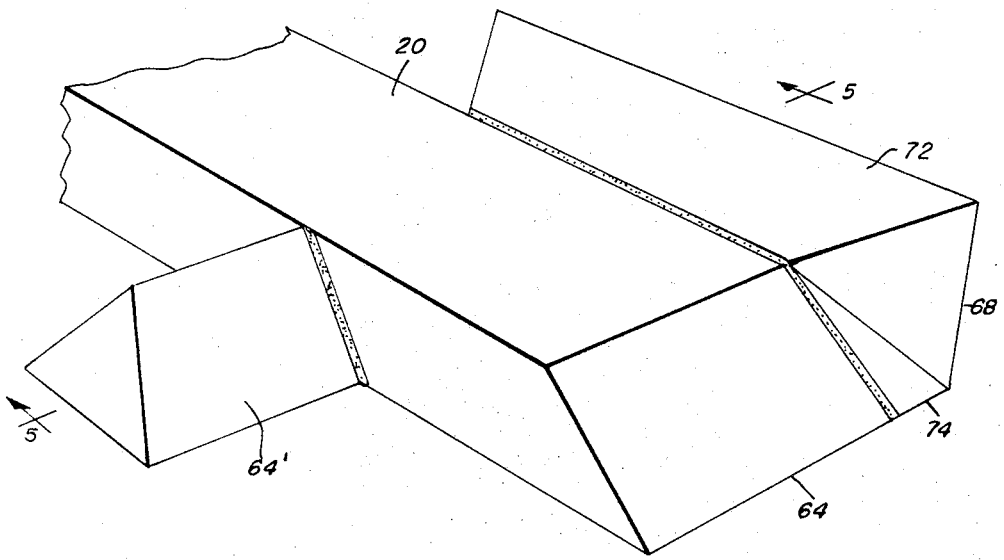
FIG. 4 is a perspective view of one of the end teeth of the bucket.

As shown in FIGS. 1 and 2, the bucket 2 has a plate forming bottom wall 4, which plate is curved upwardly to form the rear wall, and a pair of side walls 6 and 8. One edge 5 of the bottom wall is exposed and serves as the loading lip which is the first portion of the bucket to contact the material being excavated.

Located within the bucket is a removable inner bottom wall 10 and a permanently affixed front inner bottom 12 which has a sloping rear portion and a front portion which is generally parallel to the bottom wall 4. These members 10 and 12 define an enclosure for the means for driving the teeth. For purposes of illustration, the size of this enclosure is somewhat exaggerated.

Parallel to the bottom wall 4 and perpendicular to the loading lip 5 is a series of four elongated teeth 14, 16, 18 and 20. The cutting end of each of the teeth projects outwardly from the loading lip 5, and the opposite end of each tooth is a driven end, which is positively driven in a manner later described. Intermediate the ends of each tooth, the tooth is slidably supported between the bottom wall 4, a horizontal portion of the front inner bottom 12, and a series of guide blocks 22, 24 and 26. At the point of sliding support, which preferably is proximate to the loading lip 5, the central longitudinal axis of the tooth will remain in a generally fixed position during the movement of the tooth.

The driven end of the teeth have bearing blocks 44, 46, 48 and 50 attached thereto. A bushing such as that shown at 52 in FIG. 3 is rotatable within the aperture in each of the bearing blocks. This aperture may be lined with any well-known friction reducing devices such as roller bearings.

Each of the bushings 52 is eccentric to and slidably received over a shaft 39, and is affixed thereto by any suitable key means such as pin 54. The shaft 39 is parallel to the bottom wall 4 and perpendicular to the longitudinal axes of the teeth. It rotates within a pair of bearing blocks 40 and 42 which are fixedly attached to the bottom wall 4 of the bucket. The bushings have their central axes offset from each other in a manner so that the teeth will move out of phase with each other.

The driven means for rotating the shaft 39 includes a rotary hydraulic motor 28 which receives and exhausts hydraulic fluid through conduits 30 and 32, respectively. A sprocket 34 on the motor shaft is the same size as a sprocket 38 on the shaft 39, and a chain 36 transmits the rotation of the motor to the shaft.

It will be observed in FIG. 3 that as the shaft 39 rotates about its fixed central axis, the central axis of the bushing 52 will move in a circular path which lies perpendicular to the bottom wall 4 of the bucket and generally parallel to the longitudinal axes of the teeth. The motion so imparted to each tooth will cause the cutting end of the tooth to oscillate in a generally reciprocating manner, but also move slightly up and down. "Oscillate" as used herein is intended to include reciprocatory motion. This path of the cutting end is generally in the shape of a flat ellipse which has its central axis parallel to and spaced from the loading lip. This elliptical movement will facilitate the penetration of the teeth into material being excavated since, in addition to advancing only longitudinally, it will move slightly transversely to further break up the ground and to make a break between the tooth and the ground prior to removal of the tooth.

In an experimental model of the invention, excellent results were achieved by using a 1000 r.p.m., 7 horsepower hydraulic motor, and causing the driven end of each tooth to travel in a small circular path approximately ¼ inch in diameter. For most satisfactory operation, the teeth should travel ½ inch or less and operate at at least 500 cycles per minute. During one experimental test on frozen ground, it was found that the bucket was capable of excavating a given area in 1/12 the time required with a conventional bucket. Surprisingly, experiments have also shown that the direction in which the shaft 39 rotates also may make a difference in the efficiency of the bucket, due to the elliptical path of tooth travel.

Also adding to the efficiency of the power bucket is the shape of the teeth. As shown in FIG. 2, each of the teeth has its top face tapered downwardly to terminate in a primary cutting edge 58, 60, 62 and 64 at the extreme outer end of the tooth. Each of the teeth also has at least one breaker bar 58', 60', 62' and 64' attached to the sides thereof. These breaker bars are used to cut through and break up the earth which lies between the spaced apart teeth. The forward edge of each of these breaker bars may be considered to be a secondary cutting edge which lies laterally to the primary cutting edge and is spaced between the primary cutting edge and the loading lip 5 of the bucket.

Figure 5:
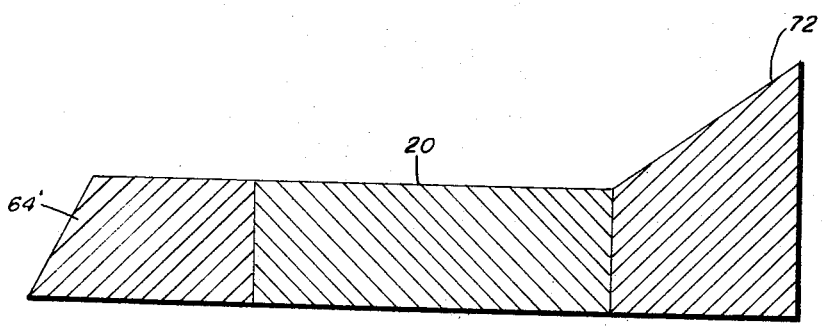
FIG. 5 is a sectional view of an end tooth, taken along the line 5—5 in FIG. 4.

The end teeth on the bucket have the breaker bars 58' and 64' only on their inner edges, and special cutting plates such as 72 are on their outer edges. The configuration of the end tooth 20 is shown best in FIGS. 4 and 5. The side cutting plate 72 is welded to the side of the tooth 20, and it extends above the top surface of the tooth. On the forward edge of the plate 72 is a cutting edge 68 which is inclined forwardly as best shown in FIG. 2. This cutting edge 68 is generally coplanar with the side wall 8 of the bucket; and thus the cut into the earth made by this tooth partially makes way for the entry of the bucket side wall 8. In a bucket of the type shown, where the side walls 8 are perpendicular to the bottom wall 4, the cutting edge 68 will, of course, be perpendicular to the cutting edge 64 on the main tooth body. A short cutting edge 74, coextensive with edge 64, is located on the side cutting plate 72.

In the foregoing description, the construction and mode of operation of a preferred embodiment of the invention has been set forth. Numerous variations to this will occur to those skilled in the art. The invention is not to be limited to the sole described form of the invention, but encompasses all modifications falling within the scope of the claims which follow.

We claim:

1. An excavating bucket comprising, a bottom wall with a loading lip at one edge thereof, a plurality of elongated teeth having cutting ends projecting from said lip in a direction generally parallel to said bottom wall, means slidably holding each of said teeth at a point intermediate its ends, a driven end on each of said teeth lying opposite to said cutting end, and means driving said driven end in a circular path lying perpendicular to said bottom wall and parallel to a longitudinal axis of said teeth and moving each said cutting end in a closed elliptical path parallel to said circular path.

2. The excavating bucket of claim 1 wherein said driving means includes a fixed rotatable shaft generally parallel to said bottom wall, a plurality of circular bushings on said shaft and eccentric thereto, each of said teeth having a circular aperture in its driven end, each of said bushings lying in a said aperture, and means rotating said shaft.

3. The excavating bucket of claim 2 wherein said shaft rotating means includes an hydraulic motor mounted on said bucket, and means transmitting rotation of said motor to said shaft.

4. The excavating bucket of claim 2 wherein each said bushing is an integral member, and key means holding said bushing to said shaft.

5. The excavating bucket of claim 2 wherein said bushings have their central axes offset from each other.

6. An excavating bucket having two side walls and a bottom wall with a loading lip, a plurality of teeth spaced apart and disposed along said lip, means oscillating said teeth in a direction generally parallel to said bottom wall, each of said teeth having a first cutting edge at its extreme outer end, each of said teeth having at least one secondary cutting edge portion located laterally to said first cutting edge and spaced between said first cutting edge and said lip, two of said teeth located at corners of said loading lip, each of said two teeth having a cutting edge lying in a plane generally perpendicular to said first cutting edge and in a plane of its respective one of said walls.

References Cited

UNITED STATES PATENTS

| | | | |
|---|---|---|---|
| 1,732,496 | 10/1929 | Brundige | 172—89 |
| 2,526,736 | 10/1950 | Edwards | 172—88 |
| 2,690,902 | 10/1954 | Ream. | |
| 3,030,715 | 4/1962 | Bodine. | |
| 3,065,557 | 11/1962 | Pewthers. | |
| 3,238,646 | 3/1966 | Oldenburg | 172—40 X |

FOREIGN PATENTS 710,650  6/1954  Great Britain.

ABRAHAM G. STONE, *Primary Examiner.*

WILLIAM A. SMITH III, *Assistant Examiner.*